United States Patent
Wakeman et al.

(10) Patent No.: US 6,353,767 B1
(45) Date of Patent: Mar. 5, 2002

(54) METHOD AND SYSTEM OF CONFIDENCE SCORING

(75) Inventors: Thomas George Wakeman, Cincinnati; Thomas Anthony Hauer, West Chester, both of OH (US); Alan Luis Arvidson, Burlington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/617,940

(22) Filed: Aug. 25, 2000

(51) Int. Cl.[7] ............................................. G06F 155/00
(52) U.S. Cl. ........................................... 700/91; 702/81
(58) Field of Search ............................. 700/91, 92, 95, 700/97, 109, 110; 702/81, 84, 179

(56) References Cited

U.S. PATENT DOCUMENTS

| | | | | |
|---|---|---|---|---|
| 5,452,218 A | * | 9/1995 | Tucker et al. | 364/468 |
| 5,581,466 A | * | 12/1996 | Van Wyk et al. | 364/486.01 |
| 5,715,181 A | * | 2/1998 | Horst | 364/554 |
| 5,878,373 A | * | 3/1999 | Cohen et al. | 702/22 |
| 5,956,251 A | * | 9/1999 | Atkinson et al. | 364/468.16 |
| 6,006,183 A | * | 12/1999 | Lai et al. | 704/235 |
| 6,253,115 B1 | * | 6/2001 | Martin et al. | 700/97 |

* cited by examiner

Primary Examiner—Joe H. Cheng
Assistant Examiner—Kim T. Nguyen
(74) Attorney, Agent, or Firm—Donald S. Ingraham; Christian G. Cabou

(57) ABSTRACT

A method of developing a confidence level in reliability or producibility prediction scores that includes generating data for a set of factors, inserting the data into scorecards and dashboards, and calculating an overall Z score and Z confidence range. The scorecards and dashboards are used to calculate the confidence level in reliability scores. Each reliability or producibility factor may be weighted as to its importance to the overall confidence level. Factors included in the method include accuracy of the critical to quality flowdown; completeness of the critical to quality flowdown; percentage of the design analyzed; comprehensiveness of the design analysis; risk assessment analysis; percentage of component. subassembly or product reuse from other projects; percentage of the design complete; verification of the process capability; plant integration; order to remittance process integration; extent of pilot run; and effectiveness of a test plan.

25 Claims, 6 Drawing Sheets

Life Cycle - Predict Life Early with Higher Confidence

| Product Stage | Conception | Release | Production | Use | Retirement |
|---|---|---|---|---|---|
| *Cost* to fix a Reliability Problem | 1 (Base) | 10X | 100X | 1000X | |
| *Confidence* in Reliablity Prediction | 0 to 90% | 20 to 95% | | 50 to 95% | |

Move to the Left

Predict Life with Higher Confidence prior to Production release by:
- Characterization of Operation and Environment
- Analysis
- Validation

*fig. 1*

Confidence Scorecard

| | | | | | Weighting Factor | Current Status | Current Score | Planned Status | Planned Score |
|---|---|---|---|---|---|---|---|---|---|
| | 1 | 5 | 9 | | | 1-9 | | 1-9 | |
| Environment | | | | | | | | | |
| Maneuver envelope defined: "G" Loads, angular vel & accel, landing, etc. | Maneuver loads est from other application | Customer maneuver envelope/loads specified via spec/reqmnt | Customer validated maneuver envelope/loads through analysis or data | | 4 | 5 | 20 | 5 | 20 |
| ... | ... | ... | ... | | ... | ... | ... | ... | ... |
| TOTAL | | | | | 459 | | 58 | | 77 | fig. 5A

| 16 Analysis | | | | Weighting Factor | Current Status 1-9 | Current Score | Planned Status 1-9 | Planned Score |
|---|---|---|---|---|---|---|---|---|
| Vibration Analysis (Global, panel, modal, etc.) | Natural frequencies determined from FEA and calculation | Natural frequencies & damping determined from FEA and ping test | Natural frequencies & damping determined from FEA and Ping test. The impact of variation on 20% resonance margin for vibration sensitive areas quantified (e.g. thin - thick panels, spraybars). | 5 | 1 | 5 | 1 | 5 |
| ... | 1 | 5 | 9 | ... | ... | ... | ... | ... |
| TOTAL | | | | 576 | | 28 | | 68 |

| 14 Validation | | | | Weighting Factor | Current Status 1-9 | Current Score | Planned Status 1-9 | Planned Score |
|---|---|---|---|---|---|---|---|---|
| Vibration Testing | Stair step engine test with instrumentation | Shake Table, Ping Tests and stair step engine tests | Shake Table, Ping Tests and stair step engine test with instrumentation to correlate with analysis | 7 | 0 | 0 | 0 | 0 |
| ... | 1 | 5 | 9 | ... | ... | ... | ... | ... |
| TOTAL | | | | 522 | | 28 | | 75 |

*fig. 5B*

METHOD AND SYSTEM OF CONFIDENCE SCORING

BACKGROUND OF INVENTION

The invention relates generally to a method and system of predicting and tracking a confidence level or score in reliability prediction within engineering and business processes that use design for six sigma techniques (DFSS).

The invention is a subset of a system for implementing a DFSS process. For any process (business, manufacturing, service, etc.), the "Z" statistic is a metric that indicates how well that process is performing. The higher the "Z" value, the better the output. The "Z" statistic measures the capability of the process to perform defect-free-work, where a defect is synonymous with customer dissatisfaction. With six sigma the common measurement index is defects-per-unit where a unit can be virtually anything—a component, a component of a jet engine, an administrative procedure, etc. The "Z" value indicates how often defects are likely to occur. As the "Z" value increases, customer satisfaction goes up along with improvement of other metrics (e.g., cost and cycle time). "Six sigma" generally refers to a quality improvement system in which statistical processes are used to assess and measure process or product capabilities (with six sigma referring to an extremely small defect rate corresponding to six standard deviations of the desired process capability).

Most uses of six sigma have been for improving a specific application, such as semiconductor manufacturing, through a quality improvement project. The basic steps in a quality improvement project are first to define the real problem by identifying the customer's critical-to-quality requirements and related measurable performance that is not meeting customer expectations. This real problem is then translated into a statistical problem through the collection of data related to the real problem. By the application of the scientific method (observation, hypothesis and experimentation), a statistical solution to this statistical problem is arrived at. This solution is deduced from the data through the testing of various hypotheses regarding a specific interpretation of the data. Confidence (prediction) intervals provide a key statistical tool used to accept or reject hypotheses that are to be tested. The arrived at statistical solution is then translated back to the customer in the form of a real solution.

In common use, data is interpreted on its face value. However, from a statistical point of view, the results of a measurement cannot be interpreted or compared without a consideration of the confidence that measurement accurately represents the underlying characteristic that is being measured. Uncertainties in measurements will arise from variability in sampling, the measurement method, operators and so forth. The statistical tool for expressing this uncertainty is called a confidence interval depending upon the exact situation in which the data is being generated.

Confidence interval refers to the region containing the limits or band of a parameter with an associated confidence level that the bounds are large enough to contain the true parameter value. The bands can be single-sided to describe an upper or lower limit or double sided to describe both upper and lower limits. The region gives a range of values, bounded below by a lower confidence limit and/or from above by an upper confidence limit, such that one can be confident (at a pre-specified level such as 95% or 99%) that the true population parameter value is included within the confidence interval. Confidence intervals can be formed for any of the parameters used to describe the characteristic of interest. In the end, confidence intervals are used to estimate the population parameters from the sample statistics and allow a probabilistic quantification of the strength of the best estimate.

A prediction interval for an individual observation is an interval that will, with a specified degree of confidence, contain a randomly selected observation from a population. The inclusion of the confidence interval at a given probability allows the data to be interpreted in light of the situation. The interpreter has a range of values bounded by an upper and/or lower limit that is formed for any of the parameters used to describe the characteristic of interest. Meanwhile and at the same time, the risk associated with and reliability of the data is fully exposed allowing the interpreter access to all the information in the original measurement. This full disclosure of the data can then be used in subsequent decisions and interpretations for which the measurement data has bearing.

A drawback to specific applications of the six sigma process is that there is a lack of flexibility to allow for the existing implementation to be applied to other business processes. There is a need to develop a confidence level in the DFSS results of a project while in the early stages of its development. With such a confidence level prediction, decisions can be made on improving the confidence of achieving a six sigma level in the final stages of the project development. It is well known to those skilled in the art of project management, that changes in the early stage of a product are easier and less expensive than if such changes are made at the customer's location.

SUMMARY OF INVENTION

An exemplary embodiment of the invention is a method of developing a confidence level in six sigma prediction scores that includes determining a customer expectation value. A Z factor comprising a set of factors is determined. The set of factors are selected and a plurality of data is generated for the set of factors. The data is collected in at least one scorecard. At least one Z score is calculated for at least one scorecard. A total Z score is generated for the scorecards. The total Z score for said scorecards is compared with the Zst value. A Z confidence range is calculated. A confidence level based upon said Z confidence range and said total Z value is scored. The confidence level is reported.

Another embodiment uses a storage medium encoded with machine-readable computer program for developing a confidence level in six sigma prediction scores. The storage medium includes instructions for causing a computer to implement a method comprising determining a customer expectation value, an availability value and a life calculation prediction value. A Z factor comprising a set of factors is determined. The set of factors are selected and a plurality of data is generated for the set of factors. The data is collected at least one scorecard. A transfer function is generated to quantify the data at the scorecards. At least one Z score is calculated for at least one scorecard. A total Z score is generated for the scorecards. The total Z score for the scorecards is compared with the Zst value. A Z confidence range is calculated. A confidence level based upon said Z confidence range and said total Z value is scored. The confidence level is reported.

These and other features and advantages of the present invention will be apparent from the following brief description of the drawings, detailed description, and appended claims and drawings.

BRIEF DESCRIPTION OF DRAWINGS

The invention will be further described in connection with the accompanying drawings in which:

FIG. 1 is a chart that illustrates nominal confidence in reliability predictions and costs to fix product defects at various stages of the product life;

FIGS. 5A and 5B are two segments of a scorecard containing the three categories comprising the overall Z factor.

DETAILED DESCRIPTION

Figure 2:
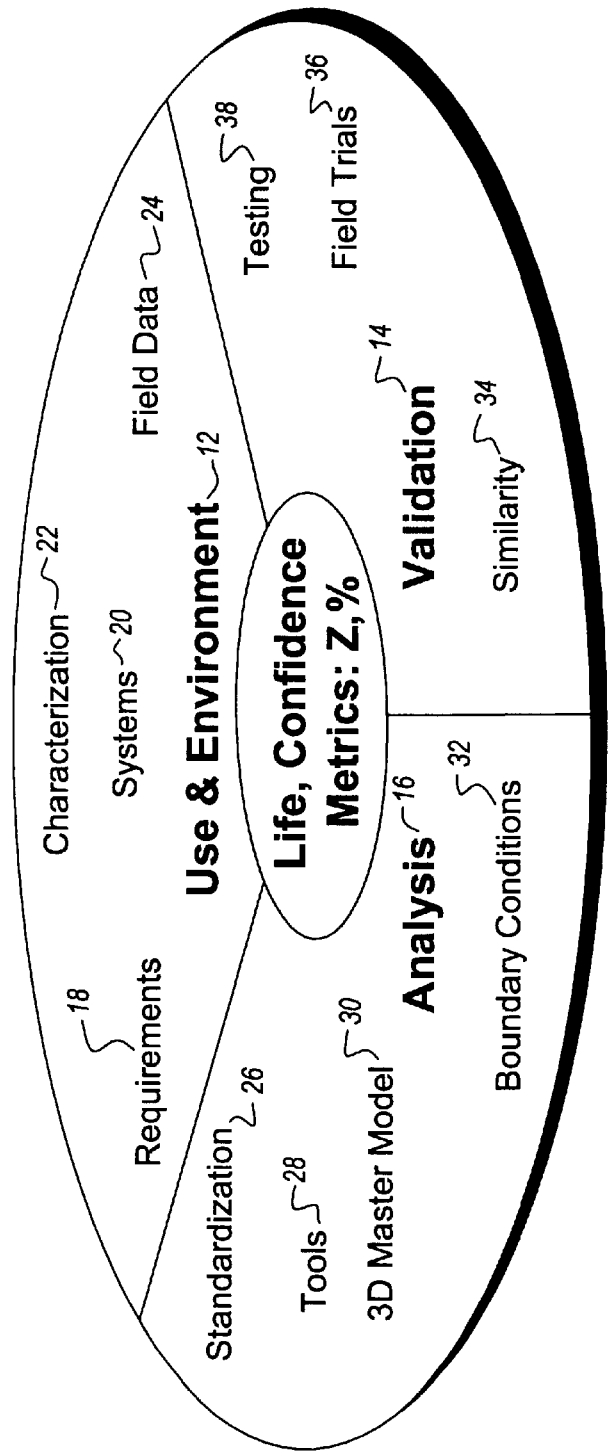
FIG. 2 illustrates the various metrics used in predicting life with confidence.

The Design for Six Sigma ("DFSS") product development process envisions both matching designs with manufacturing capabilities to achieve six sigma producibility and matching designs with the operating environment to achieve six sigma reliability. The predictions of component reliability (life) and producibility are routinely made in the product development process. When this is done in the context of six sigma the probability of achieving these predictions is often given as a statistical "Z" value (the overall sigma rating for a system is commonly referred to as Zst (Z short term). Another statistical term is that of "confidence" usually given as a percent value that indicates the degree of certainty that the predicted "Z" value is realistic and likely to be realized once the process or component is put into its designed use. When enough data is measured, both "Z" and confidence can be calculated using well know statistical methods. When no product exists to measure, these parameters can be estimated using historical data from legacy products. In the past, only the predicted "Z" value was considered prior to drawing release, that is, approval of the design documents for an article or a process, or prior to measurement of the actual performance of a product. However, there exists a need to evaluate the confidence of a product design prior to its drawing release.

FIG. 1 illustrates an exemplary embodiment of a product life cycle. As is shown, changes implemented at an early stage of the design process are easy and inexpensive, whereas, changes in a product s design made after its release, production, or use are prohibitive. If the manufacturer waits until there are product failures in the field to measure performance, it can become difficult and expensive to make the necessary changes in the design. At that point a re-design program can be implemented to addres' the poor performance of the product, as well as the immediate and negative impact experienced by the customers. To address this concern a confidence score can be estimated in the early stages of the design process using manufacturing management tools, i.e., a scorecard(s), prior to the drawing release.

An exemplary embodiment of the invention is a process including methods and tools for scoring the predicted reliability and/or producibility of components or systems throughout the product life cycle, including the conceptual and development period prior to approval of drawings and specifications to go into the production process.

A first embodiment of the method disclosed herein scores confidence for producibility predictions, or, alternatively, design(s) for assembly, and a second embodiment scores confidence for reliability predictions. However, both of these embodiments can have the following common features: scoring confidence without new product use or production data; scoring at any point in the product cycle; tracking scoring over time; depicting growth in confidence to an acceptable risk level as might be assessed in the design process based on performance, cost, and other salient factors; confidence scoring can be product specific in a general framework; percent confidence scores can be shown on scorecards; and validation of scoring methods can be provided.

FIG. 2 illustrates how the confidence scoring of a Z factor, or a life prediction, can be generalized as a combination of three exemplary categories 10, mentioned in FIG. 1, for predicting life with higher confidence. The three categories 10 can include the following: Use and Environment 12 ("E"), Validation 14 ("V"), and Analysis 16 ("A"). The Use and Environment category 12 can include such factors as Customer Requirements 18, Systems 20, Characterization 22 and Field Data 24. The Use and Environment category generally includes factors pertaining to the product's technical requirements, such as weight, cost, repair and maintainability, interaction with other components of the product including defining part failure, and other factors related to the use and environment of the product and/or its components. The Analysis category 16 can include such factors as Standardization 26, Tools 28, 3D Master Model 30 and Boundary Conditions 32. The Analysis category generally includes factors pertaining to analyzing the product, e.g. under varying amounts and types of stress, as well as when experiencing vibrational loads or forces. The Validation category 14 can include such factors as Similarity 34, Field trials 36, and Testing 38. The Validation category generally includes factors pertaining to the testing and analysis of the various components of the product during the final steps of the design process for assembly.

Each factor for each category (E, V, A) can include a confidence score. The confidence scores for each factor can be combined to generate a confidence score for the respective category, i.e., E, V, and A. The confidence scores for each category can be arithmetically averaged to generate an overall confidence score that provides a qualitative assessment of the confidence of the Z factor for that particular design:

$$(E+A+V)/3; \qquad (1)$$

In the alternative, each category can be weighted differently when, for example, generating confidence scores for each category using historical data from similar legacy products. Products previously designed for a customer are typically referred to as legacy products. Legacy products can be scored, using this method, for reliability of the legacy product's design. The legacy product scoring can be examined to determine if a specific factor or a set of factors influenced that design process. T he relative significance of one factor with respect to another can be reflected as coefficients "C" in the equation for generating the overall confidence score.

$$((C1*E)+(C2*A)+(C3*V))/3; \qquad (2)$$

The C values can be based on regression using the legacy product data. Likewise, the C values can be weighted to place more emphasis on factors that have more impact on Reliability. For instance, a particular set of factors for Use and Environment 12, for example, may be more significant in the overall design process than those factors considered in Analysis 16. As a result, the Z factors and Confidence associated therewith can be calculated to provide focus to a project or service being designed.

Figure 3:
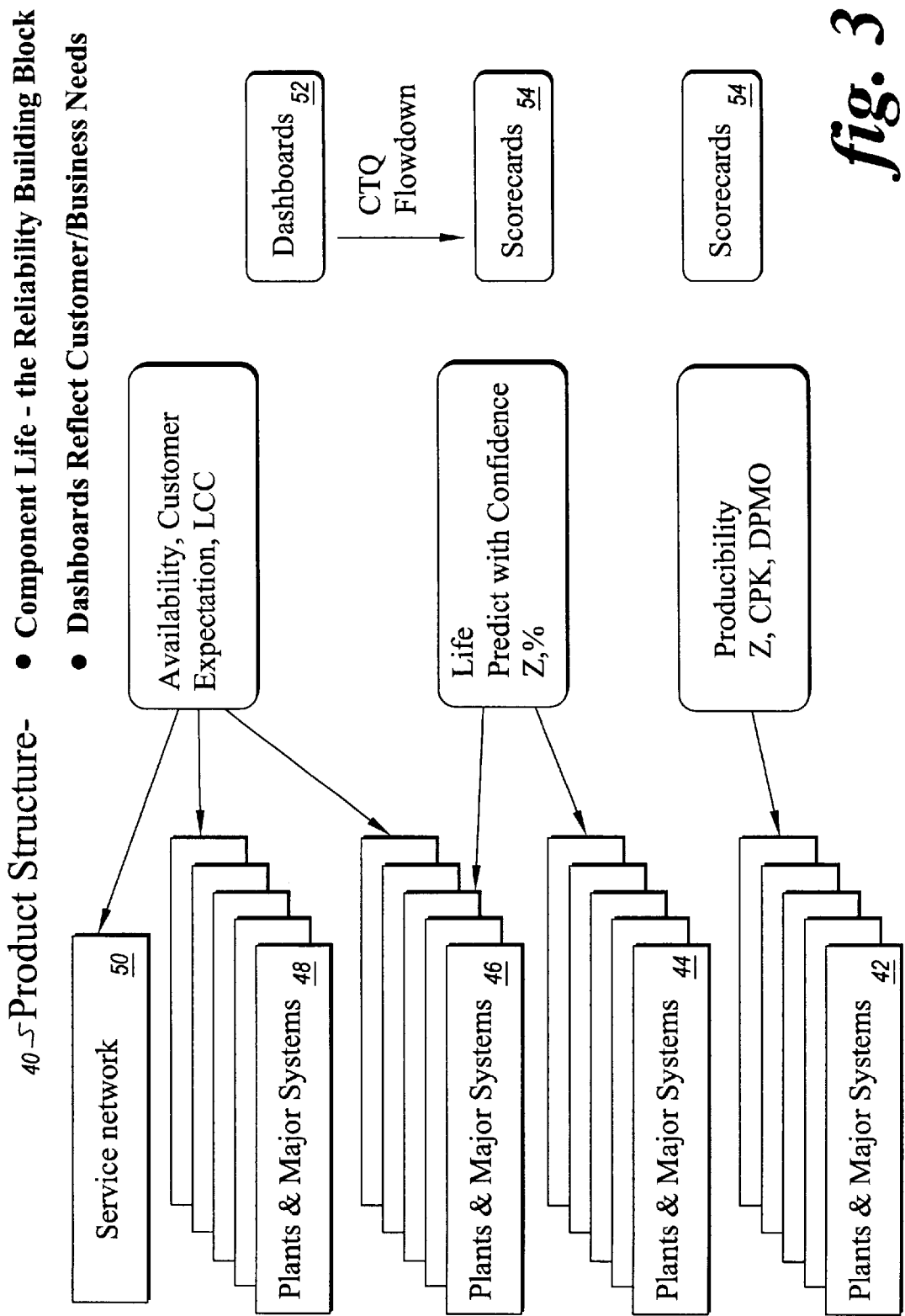
FIG. 3 illustrates the product structure used in confidence prediction.

FIG. 3 illustrates an exemplary embodiment of a flow diagram for a product structure 40. The Product Structure 40 by way of example may include the following: a Service Network 50; a Plant and Major Systems 48; a Subsystems 46; a Components 44 and a Features and Materials 42. Service Network 50 can serve as the starting point for determining the 7 factor and Confidence by identifying the availability, life calculation predictions ("LCC"), and customer expectations for the Reliability of the design process. Availability is typically defined at the systems level at Service Network 50 and Plants & Major Systems 48. Availability is generally defined for each specific design process according to the user. For example, the availability of an aircraft engine can be defined as the "time on wing". "Time on wing" refers to the duration of time measured from installing the engine on an airplane wing to removing it. The time period defines the engine's availability or it's predicted life calculation ("LCC"). The life calculation prediction and availability definition are set according to the customer's expectations, which are defined by the customer critical-to-quality requirements ("CTQ"), or those customer requirements that the product must be embodied.

In the instant application, for example, the product being designed can be an aircraft engine. The aircraft engine design can be examined as a whole at Plants & Major Systems 48. The aircraft engine can be broken down into its respective subsystems at Subsystems 46. The respective subsystems of the aircraft engine can be further examined as individual components at Components 44. Likewise, at Features & Materials 42, the individual components can be further reduced to the materials and features specific to each component. At each step in the Production Structure 40 a design process can be generated. For example, a process for designing an aircraft engine turbine blade at the Components level 44 can consist of one hundred fifty-two steps. The progress of each separate design process within the Product Structure 40 can be evaluated and quantified so that a Z factor and Confidence score can be generated. The component's life expectancy or usefulness, as defined by the customer CTQ, is also factored when generating the Z factor and Confidence score.

The breakdown of the system into features and materials of individual components coincides with the customer CTQs generated at Dashboards 52. Customer CTQs can be based upon customer product requirements. For example, an expert in the field of aircraft engines can review the product requirements and create CTQs for review at Dashboards 52. Dashboard 52 is typically a macro of a spreadsheet program such as Excel®, Lotus®, or any Windows® based spreadsheet program. Dashboard 52 is opened when needed or placed in an Excel® start directory, Lotus® start directory, or any Windows® based spreadsheet program directory so that it will read each time the program is started. Dashboard 52 may be used on any Windows based PC or any instrumentation or hardware the user may use to perform statistical analysis in accordance with six sigma.

A CTQ flowdown can then take place from Dashboards 52 to Scorecards 54 illustrative examples of which are shown in FIGS. 5A and 5B. Scorecards 54 is also preferably a macro of a spreadsheet program as described for Dashboard 52. Dashboards 52 can comprise a general overview of CTQs, and more specific CTQs can be extrapolated for review at Scorecards 54. For example, a general CTQ can pertain to an aircraft engine, for which there would be multiple subpart CTQs. One CTQ can be for a turbine of the aircraft engine, for instance, which can contain another fifty CTQs; one CTQ pertaining to each of its individual components, such as, for example, a turbine blade. Likewise, a turbine blade can include another twenty CTQs, including a CTQ pertaining to the minimum thickness on the leading edge of the turbine blade.

The Dashboards 52 can serve as a collection point for confidence scoring results of customer CTQs performed at Scorecards 54. Scorecards 54 can include the customer CTQs being examined at Components 44 and Features & Materials 42. The feedback generated at each step of the Production Structure 40 can be quantified through a transfer function. The transfer function is a mechanical representation of a process or characteristic and typically is generated specifically for the design step of the system, component, feature, and the like, being scored. As a result, a specific transfer function is generated for each design step at the Component level 44 and Features & Materials level 42 that is associated with a CTQ. The Z value generated by the transfer function is a qualitative score based upon the feedback in the Product Structure 40, so that the quantification of the design process becomes a recognizable numerical value.

Tables 1 and 2 herein illustrate examples of determining confidence in Z factors for a portion of a typical design project. The factors listed in Table 1 are defined in Table 2. Referring now to Table 2, Z factors such as the Accuracy of the CTQ Flowdown, Completeness of CTQ Flowdown, Comprehensiveness of Analysis, Risk Assessment Effectiveness, Verified Process Capability of Entitlement Database. Plant Integration, OTR Process Integration, Extent of Pilot Run, and Effectiveness of Test Plan can be assigned a qualitative numerical score such as, for example, a 9, a 5, or a 1. The numerical value corresponds to a definition of the status of the design process, which can be determined using the feedback from the Product Structure 40. For example, the Completeness of the CTQ Flowdown can be assigned a numerical value of 9, 5 or 1. A value of 9 can represent "all customer CTQs completely translated into specifications and mapped into design elements, to the part level, on all sub elements of the design". On the other hand, a value of 5 can represent "some customer CTQs translated into specifications and mapped into design elements". A higher value represents a higher degree of completion for that respective Z factor. Likewise, Z factors such as % Design Analyzed, % of Product Reuse, and % Design Complete are assigned percentages, which qualify the completion percentages of those respective factors defined in Table 2.

The descriptions provided for each Z factor further improve the Scorecards 54. Qualifying the quantified findings performed by Scorecards 54 provides a basis for determining the present and future performance of a design process. As additional scoring is performed, the descriptions are redefined for accuracy. The updated definitions are assigned more accurate and consistent numerical values. The reasoning behind the scores, and the corresponding values, become less ambiguous as the descriptions become more detailed. The exemplary confidence scoring method of the instant application thus improves itself with each use.

Referring again to Table 1, in this exemplary embodiment, the "Z" value from the Scorecard 54 was assigned a value of 5.0, which is very high and represents a "perfect", defect-free design process. The "Z" confidence range can be calculated using the "Z" factor values. The "Z" confidence range can correlate with the quality of the program such as, for example, a perfect program, an above average plan, an average program and a poor program. As can be seen from the following example, a perfect program has a zero value for its Z confidence range due to a Zst estimate of 5.0 with a Zst upper range of 5.0, therefore the confidence is very high. On the other side, a poor program can have a Zst estimate of 5.0 with a Zst upper range of 9. This situation creates a confidence range, or a single-sided confidence interval, of 4.0, which means that almost anything can happen. The program described herein can inform a design team as to how their design process rates with respect to their desired Zst estimate goal. For instance, a design team can set an exemplary goal of Zst=5, and determine, after scoring the Z factors, that their exemplary program rates as perfect, e.g., Z confidence range=0, poor, e.g., Z confidence range=4.0, above average, e.g., Z confidence range=1.0–2.0, or average, e.g. Z confidence range=2.0–3.0, depending upon their criteria.

Figure 4:
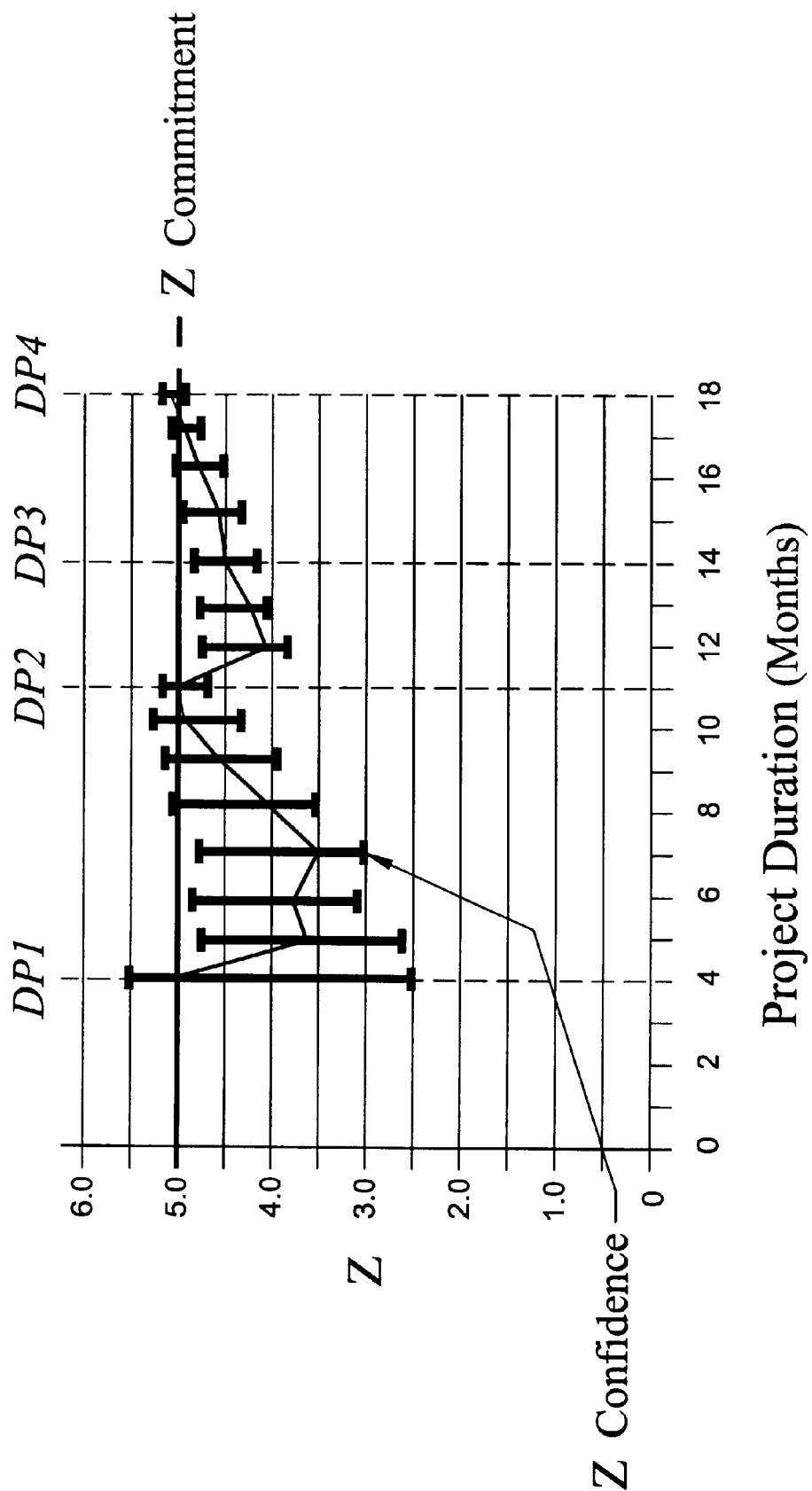
FIG. 4 illustrates the relationship between confidence and Zst over the life of a project.

FIG. 4 illustrates graphically the impact of time on the percentage of confidence calculated using the method disclosed herein for an exemplary completed product design project. The x-axis frequently represents the duration of the product design project in terms of months, or in another measure of time such as days, annually, semi-annual, decades, and the like. The y-axis frequently represents the Z values calculated using the method disclosed herein. The project duration can be further measured using tollgates referred to as DP1, DP2, DP3 and DP4. Tollgates commonly include DP1 representing Concept Review, DP2 representing Design & Tooling, DP3 representing Pilot Run, and DP4 representing Team Walks. The method disclosed herein typically is implemented prior to DP2 taking place, which is prior to the drawing release of the product design.

As is illustrated in FIG. 4, the value of a typical confidence range of a particular Zst generally improves over the life of the project. For example, the value Zst at the fourth month, or DP1, is approximately 5.0 with a range from 2.6 to 5.5, or a Z confidence range equal to 2.9. At the eighth month, or between DP1 and DP2, the value Zst is 4.0 with a range from 3.6 to 5.1, or a Z confidence range equal to 1.5. At the eighteenth month, or DP4, the Zst value is 5.1 and the range is 4.9 to 5.3, or a Z confidence range equal to 0.4. In general, even though the absolute value of Zst tends to vary significantly over the eighteen-month period shown in FIG. 4, the confidence range as measured by the rang,e of Zst tends to get smaller over time. As mentioned earlier, a lower Z confidence range equates to a better overall design process. Consequently, a higher confidence score predicted at the start of a design process can indicate a higher Z score as the process reaches a test phase at DP3, and/or its completion at DP4 when the team finishes and "walks away" from the project.

By way of example, the individual Z values for the factors of each category of Table 1 can be compiled from the Scorecards 54 using the following exemplary weighted equation:

$$Z\ \text{Range} = (9-A)/16 + (9-B)/16 + (9-(9C))/16 + (9-D)/16 + (9-E)/32 + (9-9(F))/32 + (9-9(G))/32 + (9-H)/32 + (9-I)/32 + (9-J)/32 + (9-K)/32 + (9-L)/32 \quad (3)$$

wherein factors A–L represent the factors listed in Tables 1 and 2 (Accuracy of CTQ Flowdown, etc.).

The Scorecards 54 are used for compilation of the Z range for specific CTQs that pertain to the factors listed in FIG. 1 for Categories 10. As shown in an exemplary embodiment of a partial Scorecard for E, A and V in FIGS. 5A and B. Use and Environment 12, Validation 14, and Analysis 16 can quantify their findings for the factors at Scorecard 54. An overall confidence score for Z, the life prediction of the overall design process, can be calculated from E, A and V Z values using the following exemplary equation:

$$(E+A+V)/3; \quad (4)$$

where E represents the confidence score for Use and Environment 12, A represents the confidence score for Analysis 16, and V represents the confidence score for Validation 14. Each category can be weighted equally, as indicated in equation (4), or alternatively a weighted equation can be used such as the following:

$$((C1*E)+(C2*A)+(C3*V))/3; \quad (5)$$

The weighting approach is used when it is desirable to place the value of more emphasis upon a category having a significant impact upon the overall life prediction of the product.

As experience develops in the use of the method of establishing confidence factors, the level of confidence is expected to improve. As time progresses calibrated field data on parts used in multiple products (legacy parts) will determine what level of confidence is an acceptable level. This quantification of confidence at an early stage is an important factor in the development of a reliable product that meets the customer's requirements. The ability to develop over time a confidence factor at an early stage of the product cycle is an important factor towards the efficient production and introduction of a product. The testing stage is too far down the product development cycle to be an efficient location for reliability or producibility predictions. Likewise, reliability or producibility predictions made during production and/or use are based upon a prediction using ill defined or undefined factors. The method of developing confidence scores enables the user to avoid engaging in extensive testing, while improving the overall efficiency and quality of the development and production cycles.

For example, safety issues may be weighted higher for an aircraft engine than for another product. Although cost factors are typically excluded in the evaluation, the cost to achieve a certain confidence level might be taken into account. If the costs were not considered, it might be possible to produce a product having a very high six sigma value, such as 100% confidence, at a price that would be unprofitable. The method disclosed herein typically is used to determine what confidence level changes may transpire when altering the number of factors, and their corresponding values, in order to evaluate the economic impact of choosing one factor over another to achieve a particular confidence level for reliability and producibility predictions.

Prediction scoring for reliability and producibility comprises a disciplined approach to ensure products will meet their quality goals. The approach integrates the efforts of all engineering functions into a standard framework for product modeling and specification. The method disclosed herein provides enhanced producibility by serving as a key driver of hardware cycle time, reducing risk of test failures, reducing the number of redesigns, lowering the part introduction cost, reducing risk of manufacturing defects, and reducing, engineering costs associated with manufacturing. The method disclosed herein also serves to enhance reliability by reducing warranty and concession costs, and reducing engineering costs associated with field support.

The present invention can be embodied in the form of computer-implemented processes and apparatuses for practicing those processes. The present invention can also be embodied in the form of computer program code containing instructions embodied in tangible media, such as floppy diskettes, optical media such as compact discs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for this invention, but that the invention will include all embodiments falling within the scope of the appended claims.

TABLE 1

| FACTORS | Perfect Program VALUE | Above Average Program VALUE | Average Program VALUE | Poor Program VALUE | | Maximum Z Adder |
|---|---|---|---|---|---|---|
| Z | 5.0 | 5.0 | 5.0 | 5.0 | | |
| Accuracy of CTQ Flowdown | 9 | 9 | 5 | 1 | A | .5 |
| Completeness of CTQ Flowdown | 9 | 9 | 5 | 1 | B | .5 |
| % of Design Analyzed | 100% | 75% | 50% | 0% | C | .5 |
| Comprehensive of Analysis | 9 | 5 | 5 | 1 | D | .5 |
| Risk Assessment Effectiveness | 9 | 9 | 5 | 1 | E | .25 |
| % of Product Reuse | 100% | 50% | 50% | 0% | F | .25 |
| % of Design Complete | 100% | 100% | 100% | 0% | G | .25 |
| Verified Process Capability of Entitlement Database | 9 | 5 | 5 | 1 | H | .25 |
| Plant Integration | 9 | 9 | 5 | 1 | I | .25 |
| OTC Process Integration | 9 | 9 | 5 | 1 | J | .25 |
| Extent of Pilot Run | 9 | 5 | 5 | 1 | K | .25 |
| Effectiveness of Test Plan | 9 | 9 | 5 | 1 | L | .25 |
| Z Confidence Range | 0.0 | .80 | 1.9 | 4.0 | | |
| Z Upper Range | 5.0 | 5.8 | 6.9 | 9.0 | | |
| Z from Scorecard | 5.0 | 5.0 | 5.0 | 5.0 | | |

TABLE 2

| FACTORS | DEFINITION |
|---|---|
| Z | Input the Z from the Top Level Scoreboard |
| Accuracy of CTQ Flowdown | 9 = Initial and Final Customer Focus Groups completed CTQs clearly and systematically traceable to customer CTQs<br>5 = Some design learn direct contact with customers. CTQs traceable to specification<br>1 = CTQs established based on engineering tolerances of judgment |
| Completeness of CTQ Flowdown | 9 = All customer CTQs completely translated into specifications and mapped into design elements, to the part level, on all sub elements of the design.<br>5 = Some customer CTQs translated into specifications and mapped into design elements.<br>1 = Little or no customer CTQs translated into specifications and mapped into design elements. |
| % Design Analyzed | Input the percentage of the final new product design CTQs statistically analyzed |
| Comprehensiveness of Analysis | 9 = All CTQ tolerances statistically analyzed using simulation modeling, transfer function or DoE.<br>5 = Some CTQ tolerances statistically analyzed.<br>1 = CTQ tolerance analysis based on engineering judgment, |

TABLE 2-continued

| FACTORS | DEFINITION |
| --- | --- |
| | past design tolerances or standard drawing practice. |
| Risk Assessment Effectiveness | 9 = Full cross functional risk assessment performed, all functions represented, no red, few yellow, all with a mitigation plan.<br>5 = Limited cross functional risk assessment performed, critical functions represented, no red, some yellow, most with a mitigation plan.<br>1 = Risk assessment informally performed, some function not represented, red and yellow, not all red risk has a mitigation plan. |
| % of Product Reuse | Input the percentage of the final new product design derived from similar existing products. |
| % Design Complete | Input the percentage of the final new product design currently complete. Must be greater than % Product Reuse. |
| Verified Process Capability of Entitlement Database | 9 = Entitlement Database Extensively used or Process Capability established for tolerances derived from a dedicated process.<br>5 = Partial use of Entitlement Database or Process Capability. Partial use of published specifications.<br>1 = All tolerancing based on engineering judgment, past designs, standard drawing practice or published specifications. |

[t4]

| | |
| --- | --- |
| Plant Integration | 9 = Active full-time representation by plant personnel on design project from concept thru implementation. Team activity engaged at the plan level understanding process and issues.<br>5 = Plant personnel available to discuss issues at needed. Design team calls plant when issues are discovered.<br>1 = Little plant input to design project. Design team does not fully understand plant processes and issues. |
| OTR Process Integration | 9 = OTR Process well understood, resources applied throughout design cycle. Commercialization developed with design.<br>5 = OTR Process understood, resources applied after design completion. Commercialization developed after design solidified.<br>1 = No attempt to understand OTR process until design completion. Commercialization developed after design completed. |
| Extend of Pilot Run | 9 = Complete hands-off pilot run exercising every combination of production unit. Material used is from production suppliers and final tooling.<br>5 = Pilot run completed with design team involvement exercising critical to customer CTQs.<br>1 = Pilot run completed with extensive design team involvement, built separately from the production process and exercise engineering selected units. Some of the material used is from production suppliers and final tooling. |
| Effectiveness of Test Plan | 9 = Validation/Verification plan developed simultaneously with specification development, 100% coverage of customer CTQs and clearly and systematically traceable to customer CTQs. Customer use environment well documented. Gage R&R impact understood.<br>5 = Validation/Verification plan developed after specification development but before final design, coverage of most customer CTQs and traceable to customer CTQs. Customer use environment understood but not documented. Gage R&R impact partially understood.<br>1 = Validation/Verification plan developed after final design, coverage of some customer CTQs and traceable to customer CTQs. Customer use environment not fully understood and not documented. Gage R&R impact partially understood. |

What is claimed is:

1. A method of developing, a confidence level using six sigma prediction scoring comprising: determining a customer expectation value; determining a Z factor comprising a set of factors; selecting said set of factors; generating respective data sets for said set of factors; collecting said respective data sets in at least one scorecard; calculating at least one Z score for said at least one scorecard; generating a total Z score as a function of the respective scorecard Z scores scorecards; comparing said total Z score for said scorecards with a selected Zst value; calculating a Z confidence range; scoring a confidence level based upon said Z confidence range and said total Z value; and reporting said confidence level.

2. The method of claim 1, wherein the step of determining said customer expectation value further comprises generating at least one critical-to-quality requirement based upon a customer expectation.

3. The method of claim 1, wherein the step of selecting said factors further comprises selecting at least one category containing a set of factors.

4. The method of claim 1, further comprising the step of determining an availability value.

5. The method of claim 1, further comprising the step of determining a life calculation prediction value.

6. The method of claim 1, wherein the step of selecting factors further comprises selecting said factors based upon a customer expectation, wherein said customer expectation comprises at least one critical-to-quality requirement.

7. The method of claim 1, wherein the step of generating data sets further comprises: generating data for a product design process; and generating data for said product design process in a product structure, wherein said product structure further comprises a service network, wherein said service network further comprises a plants and major systems level; a subsystems level; a components level; and a features and materials level.

8. The method of claim 7, wherein the step of generating data for said product design process comprises conducting at least one test in at least one category containing a respective set of factors.

9. The method of claim 1, further comprising the step of quantifying a capability described on said scorecard using a transfer function.

10. A method of claim 1, further comprising the step of generating a transfer function to quantify said data at said scorecards.

11. The method of claim 1, wherein the step of selecting said factors further comprises assigning at least one numerical score for each said factor.

12. The method of claim 11, wherein the step of assigning said numerical score further comprises assigning a qualitative description to said score.

13. The method of claim 12, further comprising redefining said descriptions to accurately define the meaning of said score.

14. The method of claim 1, wherein the step of generating said total Z score further comprises combining respective Z scores from respective.

15. The method of claim 1, wherein the step of calculating said Z confidence range further comprises subtracting said total Z score from said Z factor to create a Z Upper Range.

16. The method of claim 1, wherein the step of reporting said confidence level further comprises reporting a confidence level for a reliability prediction.

17. The method of claim 1, wherein the step of reporting said confidence level further comprises reporting a confidence level for a producibility prediction.

18. A storage medium encoded with machine-readable computer program for developing a confidence level in six sigma prediction scoring, the storage medium including instructions for causing a computer to implement a method comprising: determining a customer expectation value; determining an availability value; determining a life calculation prediction value; determining a Z factor comprising a set of factors; selecting said set of factors for at least one category; generating a plurality of respective data sets for said set of factors; collecting said data sets in at least one scorecard; generating a transfer function to quantify said data sets in said at least one scorecard; calculating at least one respective Z score for said at least one scorecard; generating a total Z score for all of said scorecards; comparing said total Z score for all of said scorecards with a selected Zst value; calculating a Z confidence range; scoring a confidence level based upon said Z confidence range and said total Z value; and reporting said confidence level.

19. The storage medium of claim 18, wherein said at least one category further comprises a Use and Environment category, an Analysis category, a Validation category.

20. The storage medium of claim 19, wherein said set of factors for said Use and Environment category further comprise a Customer Requirements factor, a Systems factor, a Characterization factor, and a Field Data factor.

21. The storage medium of claim 19, wherein said set of factors for said Analysis category further comprises a Standardization factor, a Tools factor, a 3D Master Model factor and a Boundary Conditions factor.

22. The storage medium of claim 19, wherein said set of factors for said Validation category further comprise a Similarity factor, a Field trials factor, and a Testing factor.

23. The storage medium of claim 18, wherein the step of reporting said confidence level further comprises reporting a confidence level for a reliability prediction.

24. The storage medium of claim 18, wherein the step of reporting said confidence level further comprises reporting a confidence level for a producibility prediction.

25. A method for using a computer to develop a confidence level in six sigma prediction scoring, comprising: determining a customer expectation value; determining an availability value; determining a life calculation prediction value; determining a Z factor comprising a set of factors; selecting said set of factors; generating a plurality of respective data sets for said set of factors; collecting said data sets in at least one scorecard; generating a respective trransfer function to quantify said respective data sets at said scorecards; calculating at least one Z score for said at least one scorecard; generating a total Z score for said scorecards; comparing said total Z score for said scorecards with a selected Zst value; calculating a Z confidence range; scoring a confidence level based upon said Z confidence range and said total Z value; and reporting said confidence level.

* * * * *